United States Patent
Ohseki et al.

(10) Patent No.: US 10,945,297 B2
(45) Date of Patent: Mar. 9, 2021

(54) TERMINAL DEVICE, BASE STATION DEVICE, AND USABLE ARCHITECTURE DETERMINATION METHOD

(71) Applicant: KDDI CORPORATION, Tokyo (JP)

(72) Inventors: Takeo Ohseki, Tokyo (JP); Toshiaki Yamamoto, Tokyo (JP); Satoshi Konishi, Tokyo (JP)

(73) Assignee: KDDI CORPORATION, Tokyo (JP)

( * ) Notice: Subject to any disclaimer, the term of this patent is extended or adjusted under 35 U.S.C. 154(b) by 0 days.

(21) Appl. No.: 16/516,750

(22) Filed: Jul. 19, 2019

(65) Prior Publication Data

US 2019/0342927 A1 Nov. 7, 2019

Related U.S. Application Data

(63) Continuation of application No. 15/125,729, filed as application No. PCT/JP2015/057339 on Mar. 12, 2015, now Pat. No. 10,405,359.

(30) Foreign Application Priority Data

Mar. 20, 2014 (JP) .................................. 2014-059098

(51) Int. Cl.
*H04W 76/10* (2018.01)
*H04W 72/04* (2009.01)
(Continued)

(52) U.S. Cl.
CPC ............. *H04W 76/10* (2018.02); *H04W 8/22* (2013.01); *H04W 16/02* (2013.01);
(Continued)

(58) Field of Classification Search
CPC ....... H04W 76/10; H04W 8/22; H04W 16/02; H04W 72/048; H04W 76/15; H04W 88/06; H04W 92/20
See application file for complete search history.

(56) References Cited

U.S. PATENT DOCUMENTS

2013/0322302 A1* 12/2013 Gholmieh ............. H04W 36/24
370/280
2014/0056243 A1 2/2014 Pelletier et al.
(Continued)

FOREIGN PATENT DOCUMENTS

CN 101465774 6/2009
EP 2816830 12/2014
(Continued)

OTHER PUBLICATIONS

Intel Corporation, "Scenarios and Benefits of Dual Connectivity", 3GPP TSG RAN WG#2, Feb. 1, 2013, pp. 1-6.
(Continued)

*Primary Examiner* — Alpus Hsu
*Assistant Examiner* — Camquyen Thai
(74) *Attorney, Agent, or Firm* — Greenblum & Bernstein, P.L.C.

(57) ABSTRACT

A terminal device is configured to establish a communication link with communication equipment through a base station device such that, upon establishing the communication link, part of the communication link is left for a certain base station while another part of the communication link is established with the terminal device through the other base station device according to a plurality of architectures, wherein the terminal device includes a wireless communication part configured to transmit support architecture information representing an architecture supported by the terminal device among a plurality of architectures to the base station device.

6 Claims, 10 Drawing Sheets

(51) Int. Cl.
*H04W 8/22* (2009.01)
*H04W 16/02* (2009.01)
*H04W 76/15* (2018.01)
*H04W 92/20* (2009.01)
*H04W 88/06* (2009.01)

(52) U.S. Cl.
CPC .......... *H04W 72/048* (2013.01); *H04W 76/15* (2018.02); *H04W 88/06* (2013.01); *H04W 92/20* (2013.01)

(56) References Cited

U.S. PATENT DOCUMENTS

| | | | |
|---|---|---|---|
| 2015/0124708 A1 | 5/2015 | Blankenship | |
| 2015/0131476 A1 | 5/2015 | Morioka et al. | |
| 2015/0181473 A1 | 6/2015 | Horn | |
| 2015/0223095 A1* | 8/2015 | Centonza | H04W 36/0088 455/67.11 |
| 2015/0334737 A1* | 11/2015 | Susitaival | H04W 24/02 370/329 |
| 2016/0174142 A1 | 6/2016 | Kitagawa et al. | |
| 2016/0212790 A1* | 7/2016 | Fujishiro | H04W 76/16 |

FOREIGN PATENT DOCUMENTS

| | | | |
|---|---|---|---|
| EP | 3089511 | 11/2016 | |
| EP | 3089511 A1 * | 11/2016 | ............. H04L 45/24 |
| JP | 2014-049956 | 3/2014 | |
| JP | 2015-185948 | 10/2015 | |
| WO | 2014/013919 | 1/2014 | |
| WO | 2014/031989 | 2/2014 | |

OTHER PUBLICATIONS

3GPP, TR 36.842, "Study on Small Cell enhancements for E-UTRA and E-UTRAN; Higher Layer aspects", Dec. 2013, V12.0.0.
Samsung, "UE capability on 1A and 3C", 3G99 TSG-RAN WG2 Meeting #85, R2-140235, Feb. 2014, pp. 1.
KDDI Corporation, "Coexistence scenarios of Dual connectivity alternatives 1A and 3C", 3GPP TSG RAN WG2 Meeting #85, R2-140419, Feb. 2014.
Search Report issued in International Patent Application No. PCT/JP2015/057339, dated Jun. 16, 2015.
Office Action issued in Japanese family member Patent Appl. No. 2014-059098, dated Aug. 15, 2017, along with an English translation thereof.
Search Report issued in EPO family member Patent Appl. No. 15764224.0, dated Oct. 6, 2017.
Office Action issued in Chinese related Patent Appl. No. 201580014166.1, dated Nov. 27, 2018, along with an English translation of the Search Report of the same.
Notice of Allowance issued by Japan Patent Office (JPO) in Japan Patent Appl. No. 2017-231085, dated Dec. 18, 2018, along with an English translation thereof.
Notice of Allowance issued by Japan Patent Office (JPO) in Japan Patent Appl. No. 2017-321092, dated Dec. 18, 2018, along with an English translation thereof.
Office Action issued in Japan Patent Office (JPO) in Japan Patent Appl. No. 2017-231100, dated Dec. 18, 2018, along with an English translation thereof.
LG Electronics Inc., Bearer Reconfiguration with Architectures 1A and 3C[online], 3GPP TSG-RAN WG2#84, 3GPP TSG-RAN WG2#84, R2-134023, Internet<URL: http://www.3gpp.org/ftp/tsg_ran/WG2_RL2/TSGR2_84/Docs/R2-134023.zip>, Nov. 15, 2013, pp. 1-4.

* cited by examiner

TERMINAL DEVICE, BASE STATION DEVICE, AND USABLE ARCHITECTURE DETERMINATION METHOD

CROSS REFERENCE TO RELATED APPLICATIONS

This is a continuation application of U.S. patent application Ser. No. 15/125,729, filed Sep. 13, 2016, which is a National Phase Application of International Application No. PCT/JP2015/057339, filed on Mar. 12, 2015. The present application claims priority on Japanese Patent Application No. 2014-059098 filed Mar. 20, 2014. The entire disclosure of each of the above-identified applications, including the specification, drawings, and claims, is incorporated herein by reference in its entirety.

TECHNICAL FIELD

The present invention relates to a terminal device, a base station device, and a usable architecture determination method.

BACKGROUND ART

Cellular network systems called LTE (Long Term Evolution), which have been standardized by standardization organizations "3GPP (3rd Generation Partnership Project)", (hereinafter, referred to as LTE systems) are well known.

FIG. 10 is a conceptual diagram showing an example of a configuration of an LTE system. In FIG. 10, each base station device (E-UTRAN NodeB) eNB_m provides its cell Cell_m. Adjacent cells Cell_m are located to partially overlap with each other. Each base station device eNB_m is connected to communication equipment S-GW called a serving gateway (Serving Gateway). Each terminal device (user equipment) UE is connected to a single base station device eNB_m. The communication equipment S-GW establishes a communication link with the terminal device UE through the base station device eNB_m. Herein, a communication link that the communication equipment S-GW establishes with the terminal device UE through the base station device eNB_m is called a bearer. The communication equipment S-GW serves as an anchor point (i.e. a point of executing switching between communication paths) when the terminal device UE changes its connection destination, i.e. the base station device eNB_m. The process of the terminal device UE changing its connection destination, i.e. the base station device eNB_m, is called handover (hand over) or handoff (hand off).

FIG. 11 is a conceptual diagram showing another example of a configuration of an LTE system. In FIG. 11, base station devices eNB_s are further installed in the LTE system of FIG. 10. Each base station device eNB_s is connected to the communication equipment S-GW. Each base station device eNB_s provides its cell Cell_s. The cell Cell_s has a smaller coverage than the cell Cell_m. Due to the usage of higher frequency bands and the necessity of accommodating multiple terminal devices UE in the future, engineers have studied to introduce the LTE system of FIG. 11. Hereinafter, the base station device eNB_m and the base station device eNB_s will be collectively referred to as "base station devices eNB" unless they need to be discriminated from each other.

In the 3GPP, engineers have studied an architecture (see Non-Patent Literature 1) in which, when the communication equipment S-GW establishes bearers with the terminal device UE through the base station device eNB, part of bearers is held by a base station device eNB while other bearers are established with the terminal device UE through another base station device eNB. FIGS. 12 and 13 are conceptual diagrams showing examples of the above architecture.

[Architecture A1 (see FIG. 12)]

FIG. 12 shows an architecture called "1A". The architecture 1A is configured to establish bearers between the communication equipment S-GW and the terminal device UE through different base station devices eNB. In FIG. 12, a bearer Br1 is established between the communication equipment S-GW and the terminal device UE through a base station device eNB(a). Additionally, a bearer Br2 is established between the communication equipment S-GW and the terminal device UE through a base station device eNB(b). According to the architecture 1A, it is possible to assume normal communication paths established between the communication equipment S-GW and the base station device eNB and between the base station device eNB and the terminal device UE in units of bearers; hence, it is possible to carry out communications between the communication equipment S-GW and the terminal device UE through different communication paths for different bearers.

[Architecture 3C (see FIG. 13)]

FIG. 13 shows an architecture called "3C". According to the architecture 3C, a single communication path is established between the communication equipment S-GW and the base station device eNB. As communication paths between the base station device eNB and the terminal device UE, part of bearers passing via the base station device eNB are divided into multiple bearers, and then part of the divided bearers reach the terminal device UE through another base station device eNB. In FIG. 13, a bearer Br3 passing via the base station device eNB(a) is established between the communication equipment S-GW and the terminal device UE. The bearer Br3 is not divided into multiple bearers. Additionally, a bearer Br4 passing via the base station device eNB(a) is established between the communication equipment S-GW and the terminal device UE. The bearer Br4 is divided into a bearer Br4(a) and a bearer Br4(b) by the base station device eNB(a). The bearer Br4(a) derived from the base station device eNB(a) directly reaches the terminal device UE. On the other hand, the bearer Br4(b) derived from the base station device eNB(a) reaches the terminal device UE through the base station device eNB(b). Transferring traffic between the base station devices eNB(a) and eNB(b) is carried out using a logical line called a line X2.

According to the aforementioned architectures 1A and 3C, the process of the terminal device UE establishing bearers with the communication equipment S-GW through a plurality of base station devices eNB is called dual connectivity. In the condition of dual connectivity, the base station device eNB holding bearers conveying control information is called a master base station (MeNB (Master E-UTRAN NodeB)) while a base station device eNB serving as a destination of transferring part of bearers is called a secondary base station device (SeNB (Secondary E-UTRAN NodeB)).

CITATION LIST

Non-Patent Literature

Non-Patent Literature 1: 3GPP Tr 36.842, "Study on Small Cell enhancements for E-UTRA and E-UTRAN; Higher Layer aspects", V 12.0.0, 2013-12

SUMMARY OF INVENTION

Technical Problem

According to the above architectures 1A and 3C, it is possible to hold part of bearers, e.g. bearers conveying control information, by a certain base station device eNB while establishing other bearers with the terminal device UE through the other base station device eNB. For example, FIG. 11 shows a configuration arranging multiple base station devices eNB_s having small coverages, which may increase the number of times base station devices carry out handover due to the movement of the terminal device UE, thus increasing the amount of control information flowing through LTE systems; this may cause a concern to suppress the transmission and reception of data traffic by the terminal device UE. As one countermeasure, it is possible to provide the architectures 1A and 3C.

However, the conventional LTE system is not designed to concurrently use both the architectures 1A and 3C in the same system. To implement dual connectivity on the condition that the terminal devices UE support (or enable) different architectures, for example, the base station device eNB needs to recognize an architecture supported by the terminal device UE connected thereto. In the conventional LTE system, however, the base station device eNB is unable to recognize an architecture supported by the terminal device UE connected thereto.

According to the architecture 3C, it is possible to use radio resources, available between the terminal device UE and a plurality of base station devices eNB, for bearers divided by the base station device(s) eNB; hence, it is possible to improve a peak throughput for each unit of bearer. In general, it is considered that the architecture 3C may increase a delay time occurring between the communication equipment S-GW and the terminal device UE since part of traffic via bearers reaching a certain base station device eNB may reach the terminal device UE through another base station device eNB. This causes a problem in which it is necessary to adopt architectures differently depending on the characteristics of architectures.

The present invention is made in consideration of the aforementioned circumstances; hence, the present invention aims to provide a terminal device, a base station device, an available architecture determination method, and a computer program, which contribute to dual connectivity implemented in the situation of arranging a plurality of terminal devices supporting different architectures.

Solution to Problem (1) A terminal device of the present invention is configured to establish a communication link with communication equipment through a base station device such that, upon establishing the communication link, part of the communication link is left for a first base station while another part of the communication link is established with the terminal device through a second base station device according to a plurality of architectures, wherein the terminal device includes a wireless communication part configured to transmit support architecture information representing an architecture supported by the terminal device among a plurality of architectures to the first base station device or the second base station device.

(2) In the terminal device it is possible to transmit the support architecture information in addition to the terminal capability information transmitted from the terminal device in response to an inquiry from the first base station device or the second base station device, or the corresponding status information of the terminal device depending on the function of a wireless communication system.

(3) In the terminal device, it is possible for the wireless communication part to transmit multiple-architecture concurrent use enabling/disabling information, representing whether or not the terminal device is able to concurrently use a plurality of architectures, to the first base station device or the second base station device.

(4) In the terminal device, it is possible to transmit the support architecture information or the multiple-architecture concurrent use enabling/disabling information in addition to the terminal capability information transmitted from the terminal device in response to an inquiry from the first base station device or the second base station device, or the corresponding status information of the terminal device depending on the function of a wireless communication system.

(5) A terminal device of the present invention is configured to establish a communication link with communication equipment through a base station device such that, upon establishing the communication link, part of the communication link is left for a first base station while another part of the communication link is established with the terminal device through a second base station device according to a plurality of architectures, wherein the terminal device includes a controller configured to determine a usable architecture based on the information representing an architecture supported by the terminal device among a plurality of architectures, and the information representing an architecture supported by the first base station device or the second base station device; and a wireless communication part configured to receive the support architecture information representing an architecture supported by the first base station device or the second base station device connected to the terminal device, thus transmitting the information, representing a usable architecture which is determined by the controller using the support architecture information received from the first base station device or the second base station device, to the first base station device or the second base station device information.

(6) A base station device of the present invention is configured to relay a communication link established between communication equipment and a terminal device such that, upon establishing the communication link, part of the communication link is left for a first base station while another part of the communication link is established with the terminal device through a second base station device according to a plurality of architectures, wherein the base station device includes a wireless communication part configured to receive the support architecture information, representing an architecture supported by the terminal device among a plurality of architectures, from the terminal device.

(7) In the base station device, it is possible to further include a controller configured to determine a usable architecture based on the support architecture information received from the terminal device, and the support architecture information representing an architecture supported by the base station device.

(8) In the base station device, the wireless communication part may receive the multiple-architecture concurrent use enabling/disabling information representing whether or not the terminal device is able to concurrently use multiple architectures, and therefore the controller may determine the usable architecture based on the support architecture information received from the terminal device, the multiple-architecture concurrent use enabling/disabling information, and the support architecture information representing the architecture supported by the base station device.

(9) A usable architecture determination method of the present invention is provided for a terminal device configured to establish a communication link with communication equipment through a base station device such that, upon establishing the communication link, part of the communication link is left for a first base station while another part of the communication link is established with the terminal device through a second base station device according to a plurality of architectures, wherein the usable architecture determination method includes a determination step of determining a usable architecture based on the information representing an architecture supported by the terminal device among a plurality of architectures, and the information representing an architecture supported by the first base station device or the second base station device; and a step of receiving the support architecture information, representing the architecture supported by the first base station device or the second base station device connected to the terminal device, from the first base station device or the second base station device, thus transmitting the information, representing the usable architecture determined by the determination step using the support architecture information received from the first base station device or the second base station device, to the first base station device or the second base station device.

(10) A usable architecture determination method is provided for a base station device configured to relay a communication link established between communication equipment and a terminal device such that, upon establishing the communication link, part of the communication link is left for a first base station while another part of the communication link is established with the terminal device through a second base station device according to a plurality of architectures, wherein the usable architecture determination method includes a step of receiving the support architecture information, representing an architecture supported by the terminal device among a plurality of architectures, from the terminal device; and a step of determining a usable architecture based on the support architecture information received from the terminal device, and the support architecture information representing an architecture supported by the base station device.

(11) A computer program stored in a non-transient computer-readable storage medium of the present invention causes a computer of a terminal device, which is configured to establish a communication link with communication equipment through a base station device such that, upon establishing the communication link, part of the communication link is left for a first base station while another part of the communication link is established with the terminal device through a second base station device according to a plurality of architectures, to implement a determination step of determining a usable architecture based on the information representing an architecture supported by the terminal device among a plurality of architectures, and the information representing an architecture supported by the first base station device or the second base station device; and a step of receiving the support architecture information, representing the architecture supported by the first base station device or the second base station device connected to the terminal device, from the first base station device or the second base station device, thus transmitting the information, representing the usable architecture determined by the determination step using the support architecture information received from the first base station device or the second base station device, to the first base station device or the second base station device.

(12) A computer program stored in a non-transient computer-readable storage medium of the present invention causes a computer of a base station device, which is configured to relay a communication link established between communication equipment and a terminal device such that, upon establishing the communication link, part of the communication link is left for a first base station while another part of the communication link is established with the terminal device through a second base station device according to a plurality of architectures, to implement a step of receiving the support architecture information, representing an architecture supported by the terminal device among a plurality of architectures, from the terminal device; and a step of determining a usable architecture based on the support architecture information received from the terminal device, and the support architecture information representing an architecture supported by the base station device.

Advantageous Effects of Invention

According to the present invention, it is possible to obtain an effect of contributing to dual connectivity implemented in the situation of arranging a plurality of terminal devices supporting different architectures.

DESCRIPTION OF EMBODIMENTS

Hereinafter, the embodiments of the present invention will be described with reference to the drawings. The present embodiment describes an LTE system as an example of a wireless communication system.

First Embodiment

First, a first embodiment serving as one embodiment of the present invention will be described below.

Figure 1:
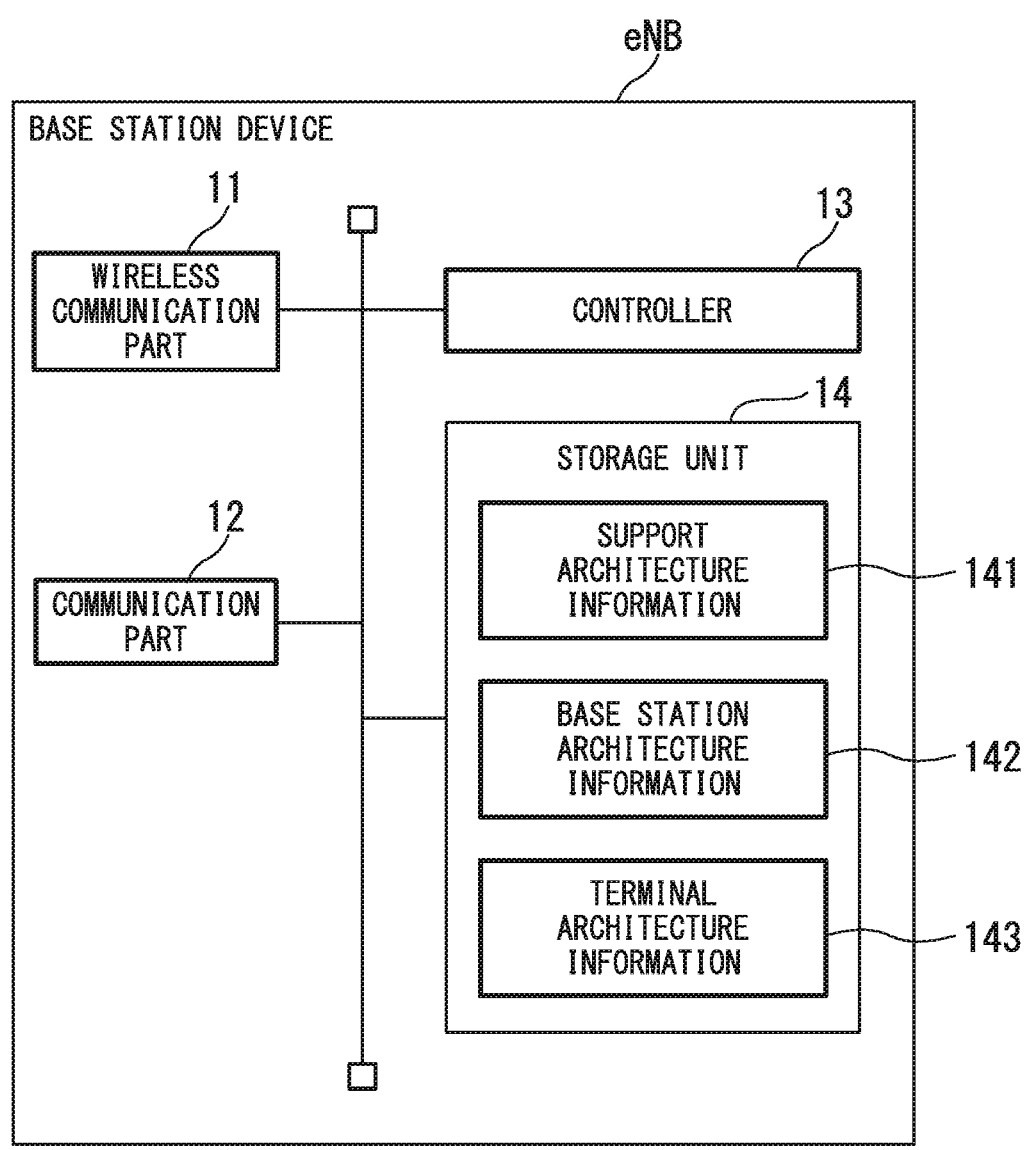
FIG. 1 is a block diagram showing a configuration of a base station device eNB according to one embodiment of the present invention.

FIG. 1 is a block diagram showing the configuration of a base station device eNB according to one embodiment of the present invention.

In FIG. 1, the base station device eNB includes a wireless communication part 11, a communication part 12, a controller 13, and a storage unit 14. The wireless communication part 11, the communication part 12, the controller 13, and the storage unit 14 are connected together to mutually transmit and receive data therebetween. The wireless communication part 11 wirelessly communicates with the terminal device UE.

The communication part 12 communicates with other devices through backbone networks. For example, the communication part 12 communicates with the communication equipment S-GW. The controller 13 controls the operation of the base station device eNB. The storage unit 14 stores data therein.

Figure 12:
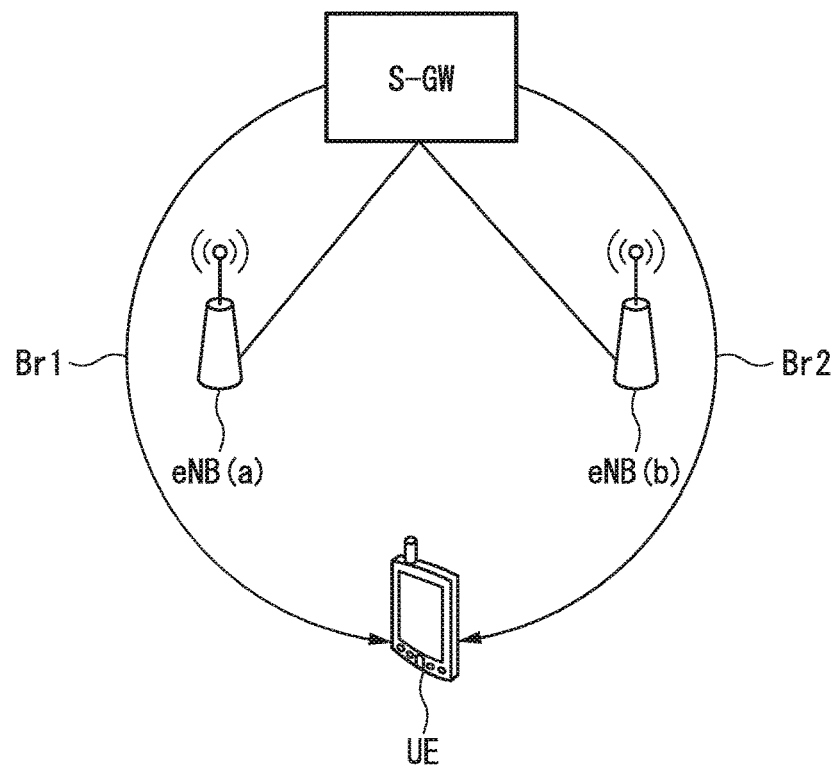
FIG. 12 is a conceptual diagram showing an architecture 1A.
Figure 13:
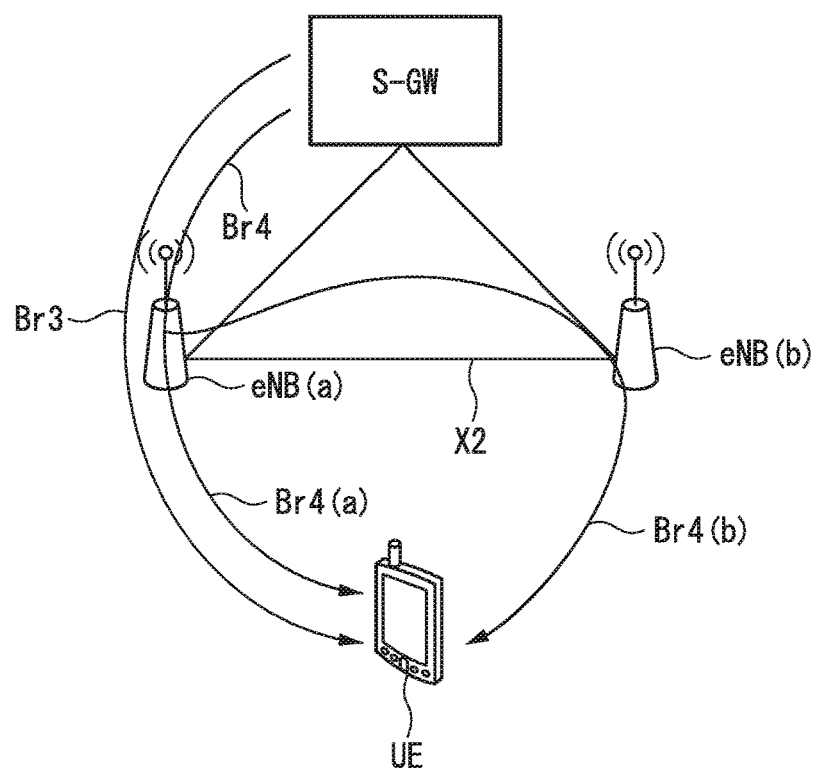
FIG. 13 is a conceptual diagram showing an architecture 3C.

The storage unit 14 includes support architecture information 141, base station architecture information 142, and a terminal architecture information 143. The support architecture information 141 represents an architecture supported by the base station device eNB. The present embodiment refers to an LTE system that shares two architectures 1A (see FIG. 12) and 3C (see FIG. 13). For this reason, the support architecture information 141 indicates which of the architectures 1A and 3C (i.e. either 1A or 3C, or both 1A and 3C) is supported by the base station device eNB.

The base station architecture information 142 represents an architecture supported by another base station device eNB. Specifically, it indicates which of the architectures 1A and 3C (i.e. either 1A or 3C, or both 1A and 3C) is supported by another base station device eNB.

The terminal architecture information 143 represents an architecture supported by the terminal device UE. Specifically, it indicates which of the architectures 1A and 3C (i.e. either 1A or 3C, or both 1A and 3C) is supported by the terminal device UE.

Figure 2:
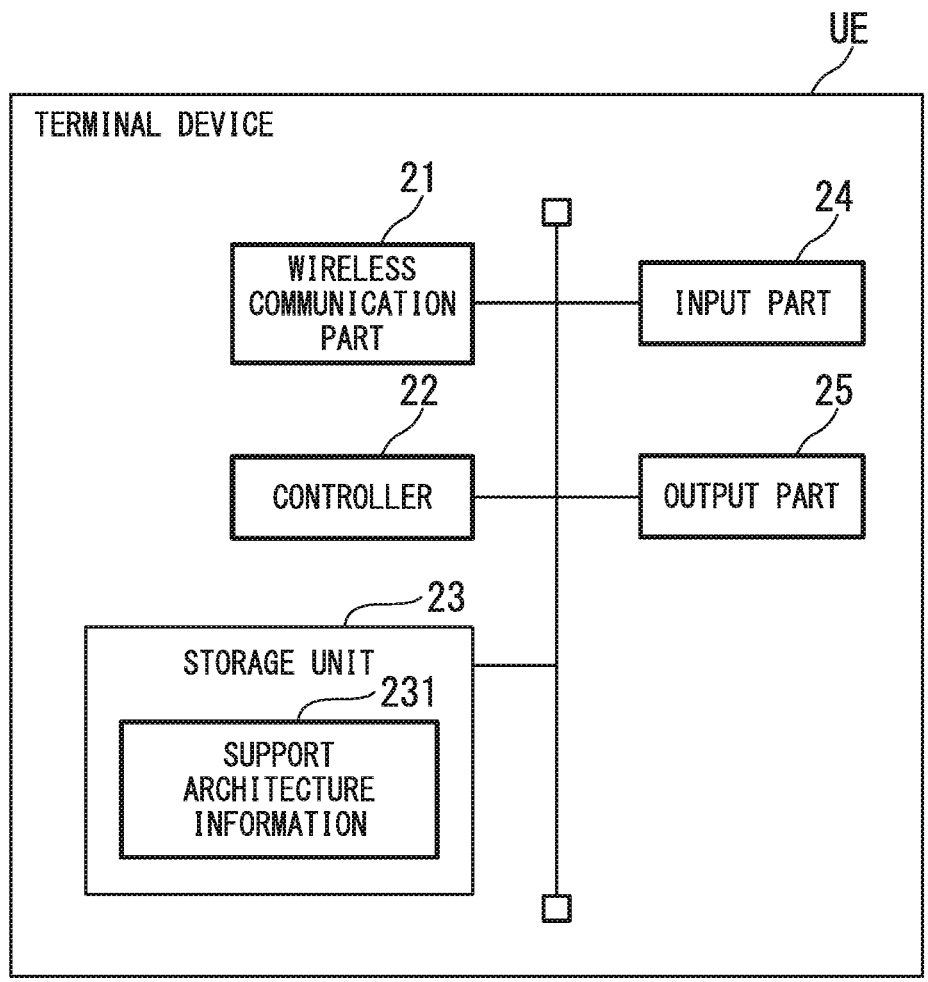
FIG. 2 is a block diagram showing a configuration of a terminal device UE according to one embodiment of the present invention.

FIG. 2 is a block diagram showing the configuration of a terminal device UE according to one embodiment of the present invention. In FIG. 2, the terminal device UE includes a wireless communication part 21, a controller 22, a storage unit 23, an input part 24, and an output part 25. The wireless communication part 21, the controller 22, the storage unit 23, the input part 24, and the output part 25 are connected together to mutually transmit and receive data therebetween. The wireless communication part 21 communicates with other devices through the base station device eNB wirelessly communicated therewith.

The controller 22 controls the operation of the terminal device UE. The storage unit 23 stores data therein.

The input part 24 inputs data. The output part 25 outputs data. As the input part 24, for example, it is possible to name an input device, e.g. a keyboard, a ten-key unit, and a mouse, as well as a microphone configured to input sound, and a receiver device for use in a near-field wireless communication. As the output part 25, for example, it is possible to name a display device, e.g. a liquid crystal display device, a speaker configured to output sound, and a transmitter device for use in a near-field wireless communication. Alternatively, it is possible to provide a touch panel sharing both the functions of an input device and a display device. As the terminal device UE, for example, it is possible to provide a mobile communication terminal device such as a smartphone and a tablet computer (or a tablet PC).

The storage unit 23 includes support architecture information 231. The support architecture information 231 represents an architecture supported by the terminal device UE. Specifically, it indicates which of the architectures 1A and 3C (i.e. either 1A or 3C, or both 1A and 3C) is supported by the terminal device UE.

Figure 3:
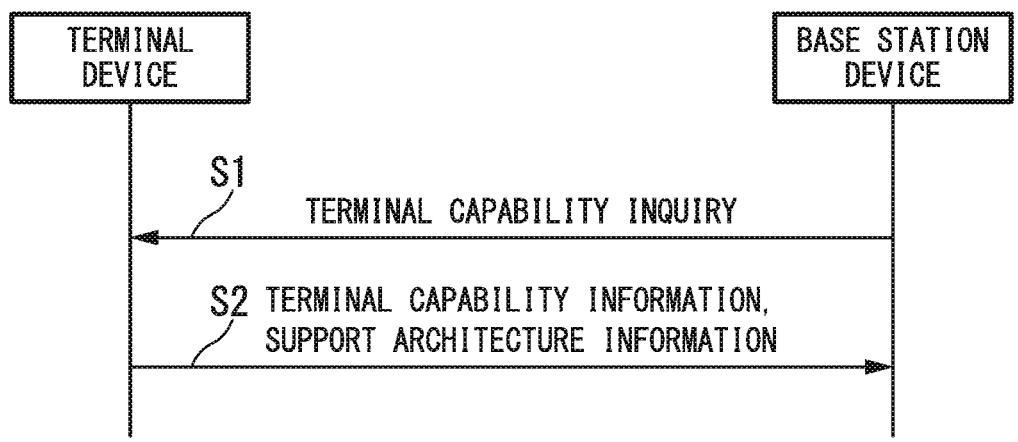
FIG. 3 is a sequence chart showing a procedure concerning an architecture information acquiring method according to a first embodiment of the present invention.

Next, the operation of the first embodiment will be described with reference to FIG. 3. FIG. 3 is a sequence chart showing the procedure concerning an architecture information acquiring method according to the first embodiment of the present invention.

The present embodiment employs a procedure of inquiring a capability of a terminal device. When the terminal device UE starts connecting to the base station device eNB, the base station device eNB needs to recognize functions applicable to the terminal device UE, thus transmitting the corresponding setting and communication instructions to the terminal device UE. For this reason, the base station device eNB inquires the terminal device UE about information concerning functions applicable to the terminal device UE (i.e. information of a terminal capability (user equipment capability)). Upon receiving an inquiry about a terminal capability from the base station device eNB, the terminal device UE notifies its terminal capability to the base station device eNB.

(Step S1)

The controller 13 of the base station device eNB transmits a message concerning a terminal capability inquiry to the terminal device UE by way of the wireless communication part 11.

(Step S2)

In response to a terminal capability inquiry from the base station device eNB, the controller 13 of the terminal device UE transmits the information of its terminal capability and the support architecture information 231 (i.e. the information representing an architecture supported by the terminal device UE) to the base station device eNB.

The controller 13 of the base station device eNB receives the support architecture information (i.e. the information representing an architecture supported by the terminal device UE) replied by the terminal device UE in response to a terminal capability inquiry, thus storing the support architecture information as the terminal architecture information 143 of the terminal device UE in the storage unit 14.

Second Embodiment

Next, the second embodiment as one embodiment of the present invention will be described below. The base station device eNB has the same configuration as FIG. 1 according to the first embodiment. The terminal device UE has the same configuration as FIG. 2 according to the first embodiment.

Figure 4:
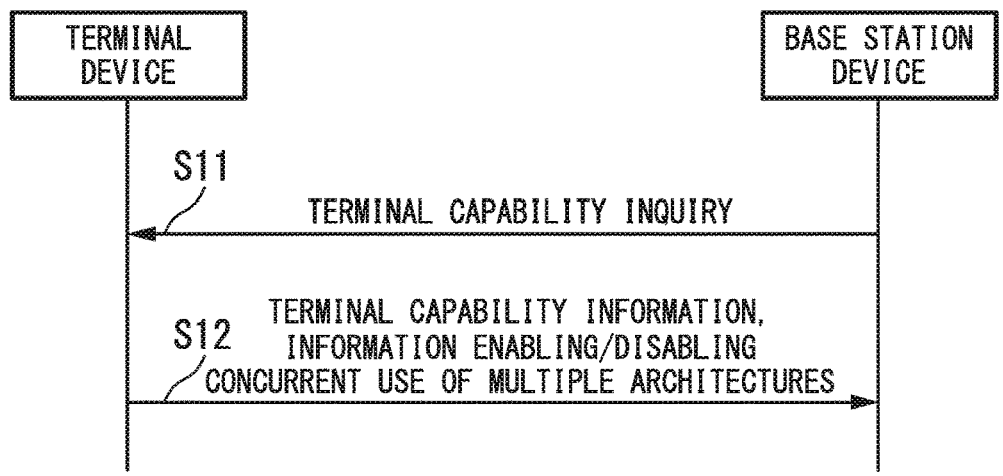
FIG. 4 is a sequence chart showing a procedure concerning an architecture information acquiring method according to a second embodiment of the present invention.

FIG. 4 is a sequence chart showing the procedure concerning an architecture information acquiring method according to the second embodiment of the present invention. The operation of the second embodiment will be described with reference to FIG. 4. Similar to the first embodiment, the architecture information acquiring method of the second embodiment employs a procedure of inquiring about a terminal capability.

(Step S11)

The controller 13 of the base station device eNB transmits a message of a terminal capability inquiry to the terminal device UE by way of the wireless communication part 11.

(Step S12)

In response to the terminal capability inquiry from the base station device eNB, the controller 22 of the terminal device UE transmits the terminal capability information of the terminal device UE and the information enabling/disabling the concurrent use of multiple architectures to the base station device eNB by way of the wireless communication part 21. The information enabling/disabling the concurrent use of multiple architectures is included in the support architecture information 231 stored in the storage unit 23. At this time, it is possible to transmit the support architecture information 231 (i.e. the information representing an architecture supported by the terminal device UE and the information enabling/disabling the concurrent use of multiple architectures) to the base station device eNB.

The information enabling/disabling the concurrent use of multiple architectures indicates whether or not the terminal device UE is able to concurrently use multiple architectures (i.e. both the architectures 1A and 3C in the present embodiment). Determination as to whether or not both the architectures 1A and 3C can be concurrently used is set to the support architecture information 231 according to hardware specifications or the like of the terminal device UE in advance.

The controller 13 of the base station device eNB receives the information enabling/disabling the concurrent use of multiple architectures from the terminal device UE which replies to a terminal capability inquiry, thus storing the information as the terminal architecture information 143 of the terminal device UE in the storage unit 14. Upon receiving the support architecture information (i.e. the information representing an architecture supported by the terminal device UE and the information enabling/disabling the concurrent use of multiple architectures) from the terminal device UE, the controller 13 stores the support architecture information (i.e. the information representing an architecture supported by the terminal device UE and the information enabling/disabling the concurrent use of multiple architectures) as the terminal architecture information of the terminal device UE in the storage unit 14.

Figure 5:
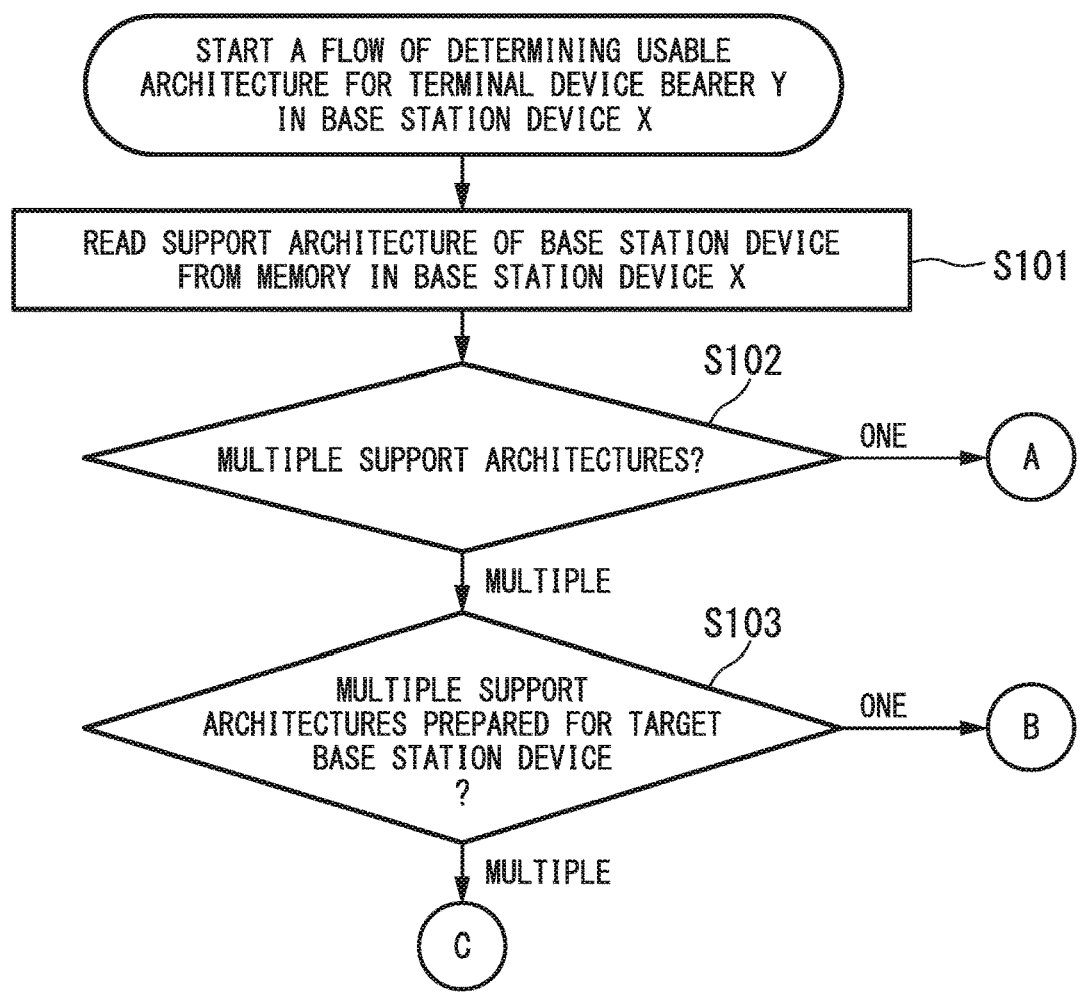
FIG. 5 is a flowchart showing a procedure concerning an available architecture determination method according to the second embodiment of the present invention.
Figure 6:
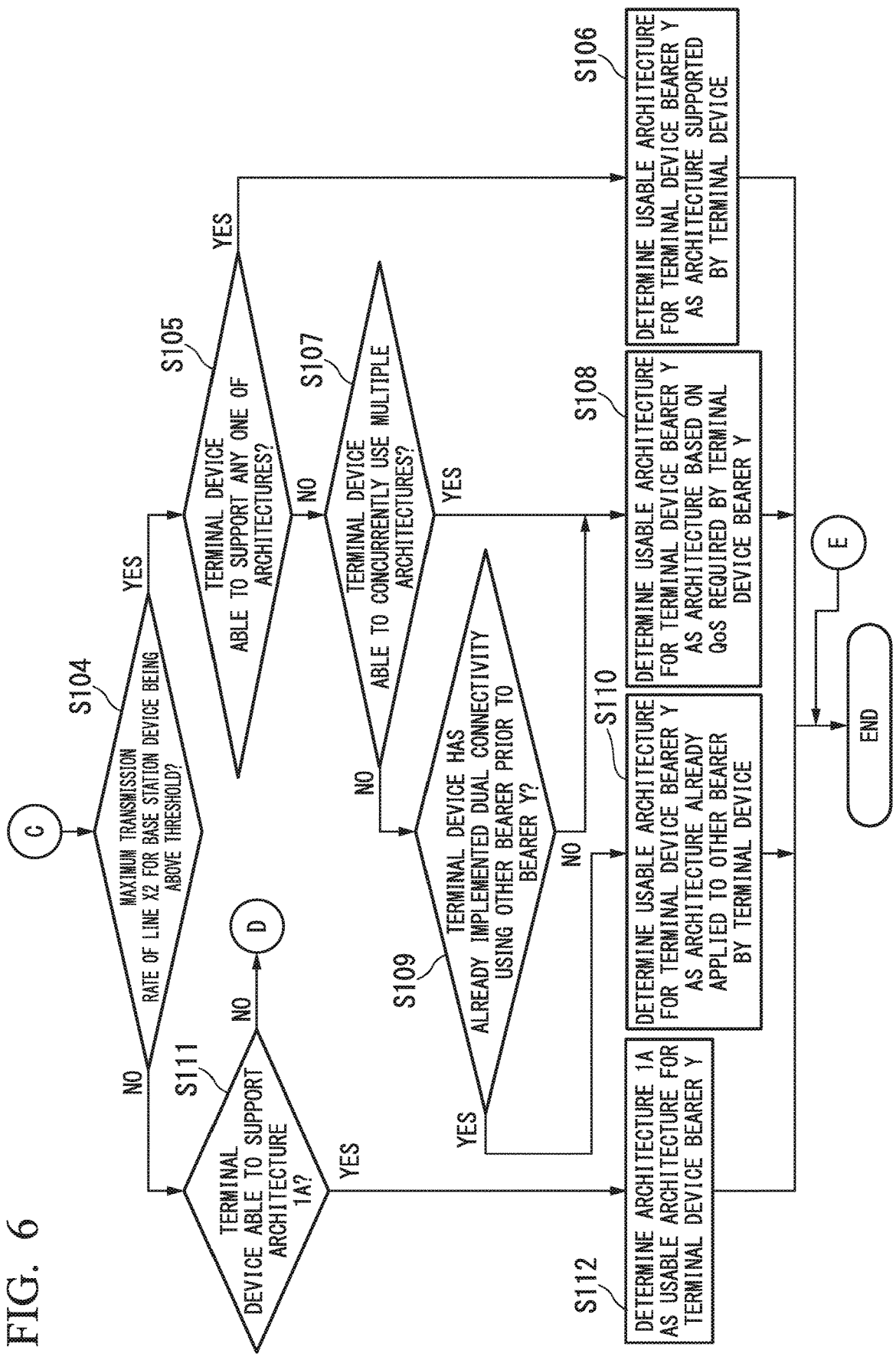
FIG. 6 is a flowchart showing a procedure concerning an available architecture determination method according to the second embodiment of the present invention.
Figure 7:
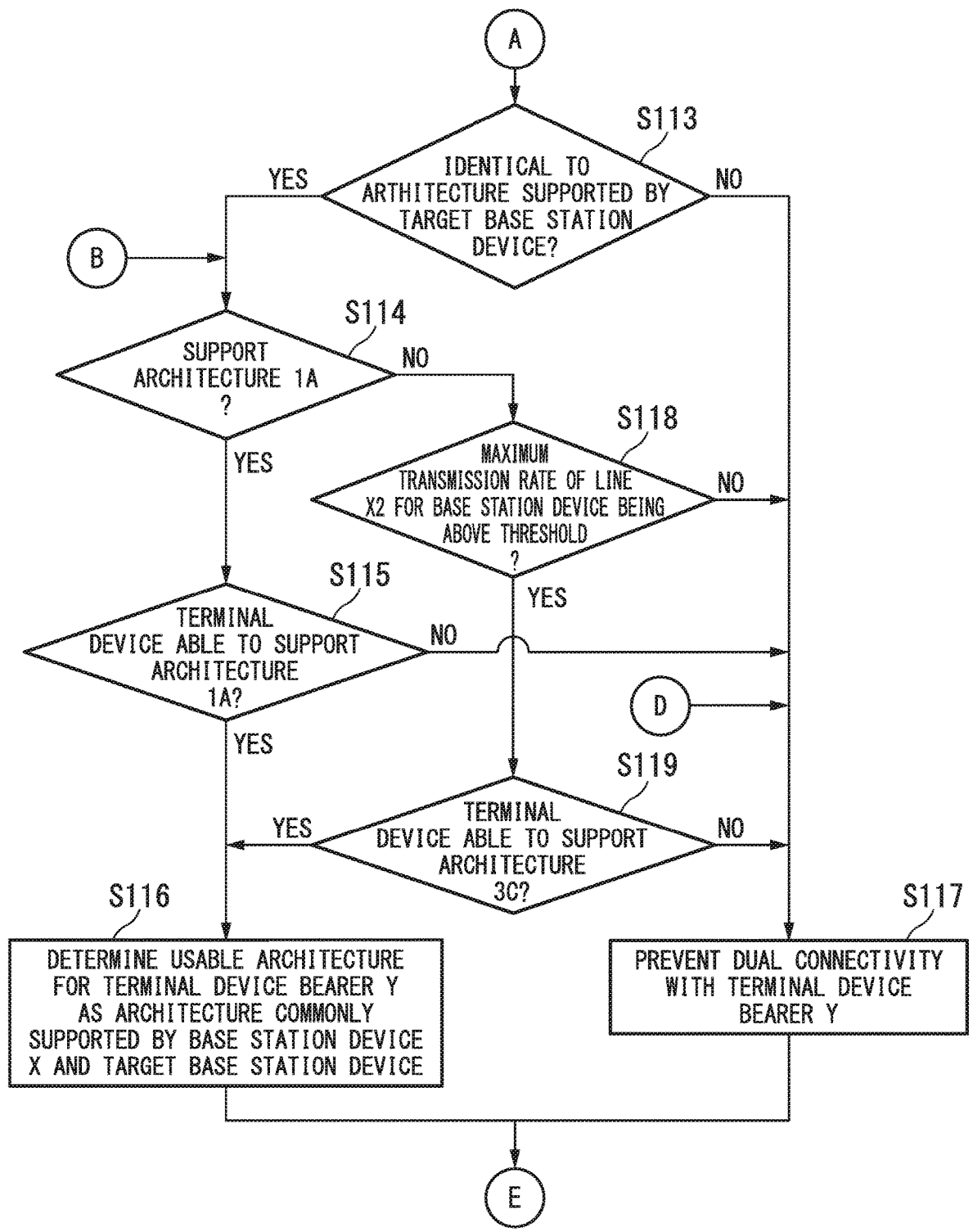
FIG. 7 is a flowchart showing a procedure concerning an available architecture determination method according to the second embodiment of the present invention.

Next, the process of determining a usable architecture by the controller 13 of the base station device eNB will be described with reference to FIGS. 5, 6, and 7. FIGS. 5, 6, and 7 are flowcharts showing the procedure concerning a usable architecture determination method according to the second embodiment of the present invention. Herein, the base station device eNB will be referred to as a base station device X in the description relating to FIGS. 5, 6, and 7. The target base station device eNB refers to a counterpart base station device eNB which carries out dual connectivity with the base station device X. Additionally, a bearer Y, i.e. a bearer passing through the base station device X, is newly established between the terminal device UE and the communication equipment S-GW.

(Step S101)

The controller 13 reads the support architecture information 141 of the base station device X from the storage unit 14.

(Step S102)

The controller 13 determines whether or not the read support architecture information 141 indicates multiple architectures. The flow proceeds to step S103 when the determination result indicates multiple architectures, while the flow proceeds to step S113 shown in FIG. 7 when the determination result indicates a single architecture.

(Step S103)

The controller 13 determines whether or not the base station architecture information 142 of the target base station device eNB stored in the storage unit 14 indicates multiple architectures. The flow proceeds to step S104 shown in FIG. 6 when the determination result indicates multiple architectures, while the flow proceeds to step S114 shown in FIG. 7 when the determination result indicates a single architecture.

The controller 13 determines whether or not the maximum transmission rate of a line X2 between the base station device X and the target base station device eNB is equal to or above the predetermined threshold. The flow proceeds to step S105 when the determination result indicates that the maximum transmission rate is equal to or above the predetermined threshold, while the flow proceeds to step S11 when the determination result indicates that the maximum transmission rate is less than the predetermined threshold.

The information representing the maximum transmission rate of the line X2 between the base station device X and the target base station device eNB is stored in the storage unit 14 in advance. For example, the controller 13 carries out measurement using the communication part 12 after establishment of the line X2 so as to acquire the maximum transmission rate information of the line X2 indicating the maximum transmission rate of the line X2 carrying out data transmission. Next, the controller 13 stores the acquired maximum transmission rate information of the line X2 in the storage unit 14.

(Step S105)

The controller 13 determines whether or not the terminal architecture information 143 of the terminal device UE stored in the storage unit 14 indicates a single architecture. The flow proceeds to step S106 when the determination result indicates a single architecture, while the flow proceeds to step S107 when the determination result indicates multiple architectures.

(Step S106)

The controller 13 determines the architecture used for the bearer Y of the terminal device UE as a single architecture supported by the terminal device UE. This is because, both the base station device X and the target base station device eNB support both the architectures 1A and 3C, and the maximum transmission rate of the line X2 between those base station devices is equal to or above the predetermined threshold; hence, the terminal device UE supports a single architecture.

(Step S107)

The controller 13 determines whether or not the information enabling/disabling the concurrent use of multiple architectures, included in the terminal architecture information 143 of the terminal device UE stored in the storage unit 14, indicates whether or not the terminal device UE is able to concurrently use multiple architectures. The flow proceeds to step S108 when the determination result indicates that the terminal device UE is able to concurrently use multiple architectures, while the flow proceeds to step S109 when the determination result indicates that the terminal device US is unable to concurrently use multiple architectures.

(Step S108)

The controller 13 determines an architecture used for the bearer Y of the terminal device UE as an architecture based on QoS (Quality of Service) required by the bearer Y. This is because all the base station device X, the target base station device eNB, and the terminal device UE support both the architectures 1A and 3C; the maximum transmission rate of the line X2 between those base station devices is equal to or above the predetermined threshold; the terminal device UE is able to concurrently use both the architectures 1A and 3C, or the terminal device UE has not implemented dual connectivity (see step S109 which will be described later). That is, it is possible to use either the architecture 1A or 3C depending on QoS required by the bearer Y.

For example, it is possible to use the architecture 1A when a delay time required by the bearer Y is less than a certain threshold, otherwise, it is possible to use the architecture 3C. Alternatively, it is possible to use the architecture 1A when a transmission speed required by the bearer Y is less than a certain threshold, otherwise, it is possible to use the architecture 3C.

(Step S109)

The controller 13 determines whether or not the terminal device UE has established another bearer prior to the bearer Y so as to implement dual connectivity. The flow proceeds to step S110 when the determination result indicates that the terminal device UE implements dual connectivity by establishing another bearer, otherwise, the flow proceeds to step S108.

(Step S110)

The controller 13 determines an architecture used for the bearer of the terminal device UE as an architecture which the terminal device UE has already used for another bearer.

This is because all the base station device X, the target base station device eNB, and the terminal device UE support both the architectures 1A and 3C; the maximum transmission rate of the line X2 between those base station devices is equal to or above the predetermined threshold; the terminal device UE is unable to concurrently use both the architectures 1A and 3C; the terminal device UE has already implemented dual connectivity using any one of architectures.

(Step S111)

The controller 13 determines whether or not the terminal architecture information 143 of the terminal device UE stored in the storage unit 14 supports the architecture 1A. The flow proceeds to step S112 when the determination result indicates that the terminal device UE supports the architecture 1A, while the flow proceeds to step S117 shown in FIG. 7 when the determination result indicates that the terminal device UE does not support the architecture 1A.

(Step S112)

The controller 13 determines the architecture 1A as the architecture used for the bearer Y of the terminal device UE. This is because both the base station device X and the target base station device eNB support both the architectures 1A and 3C; the maximum transmission rate of the line X2 between those base station devices is less than the predetermined threshold; the terminal device UE supports the architecture 1A.

(Step S113)

The controller 13 determines whether or not any one of architectures indicated by the base station architecture information 142 of the target base station device eNB stored in the storage unit 14 is identical to a single architecture indicated by the support architecture information 141 which is read from the storage unit 14 in step S101. The flow proceeds to step S114 when the determination result indicates that those architectures are identical to each other, while the flow proceeds to step S117 when the determination result indicates that those architectures are not identical to each other.

(Step S114)

The controller 13 determines whether or not the architecture commonly supported by the base station device X and the target base station device eNB is identical to the architecture 1A. The flow proceeds to step S115 when the determination result indicates that the commonly supported architecture is identical to the architecture 1A, while the flow proceeds to step S118 when the determination result indicates that the commonly supported architecture is not identical to the architecture 1A.

(Step S115)

The controller 113 determines whether or not the terminal architecture information 143 of the terminal device UE stored in the storage unit 14 supports the architecture 1A. The flow proceeds to step S116 when the determination result indicates that the terminal device UE supports the architecture 1A, while the flow proceeds to step S117 when the terminal device UE does not support the architecture 1A.

(Step S116)

The controller 13 determines the architecture used for the bearer Y of the terminal device UE as the architecture commonly supported by the base station device X and the target base station device eNB. This is because a single architecture is commonly supported by the base station device X and the target base station device eNB; the maximum transmission rate of the line X2 between those base station devices is equal to or above the predetermined threshold (see step S118 which will be described later): the terminal device UE supports the architecture commonly supported by the base station device X and the target base station device eNB (see step S119 which will be described later).

(Step S117)

The controller 13 determines that the terminal device UE does not implement dual connectivity via the bearer Y. This is because no architecture is commonly supported by the base station device X and the target base station device eNB; the architecture 3C serves as a single architecture commonly supported by the base station device X and the target base station device eNB, but the maximum transmission rate of the line X2 between those base station devices is less than the predetermined threshold (see step S118 which will be described later); the terminal device UE does not support a single architecture commonly supported by the base station device X and the target base station device eNB (see step S119 which will be described later).

(Step S118)

The controller 13 determines whether or not the maximum transmission rate of the line X2 between the base station device X and the target base station device eNB is equal to or above the predetermined threshold. The flow proceeds to step S119 when the maximum transmission rate is equal to or above the threshold, while the flow proceeds to step S117 when the maximum transmission rate is less than the threshold.

(Step S119)

The controller 13 determines whether or not the terminal architecture information 143 of the terminal device UE stored in the storage unit 14 supports the architecture 3C. The flow proceeds to step S116 when the determination result indicates that the terminal device UE supports the architecture 3C, while the flow proceeds to step S117 when the determination result indicates that the terminal device UE does not support the architecture 3C.

Third Embodiment

Next, the third embodiment as one embodiment of the present invention will be described below. The base station device eNB has the same configuration as FIG. 1 according to the first embodiment. The terminal device UE has the same configuration as FIG. 2 according to the first embodiment.

In the third embodiment, the base station device eNB notifies the architecture supported thereby (i.e. the support architecture information 141) to the terminal device UE. The terminal device UE stores the support architecture information, notified by the base station device eNB, in the storage unit 23. Then, the terminal device UE determines a usable architecture based on the architecture supported by the base station device eNB and the architecture supported thereby (i.e. the support architecture information 231), thus notifying the determined usable architecture to the base station device eNB.

Figure 8:
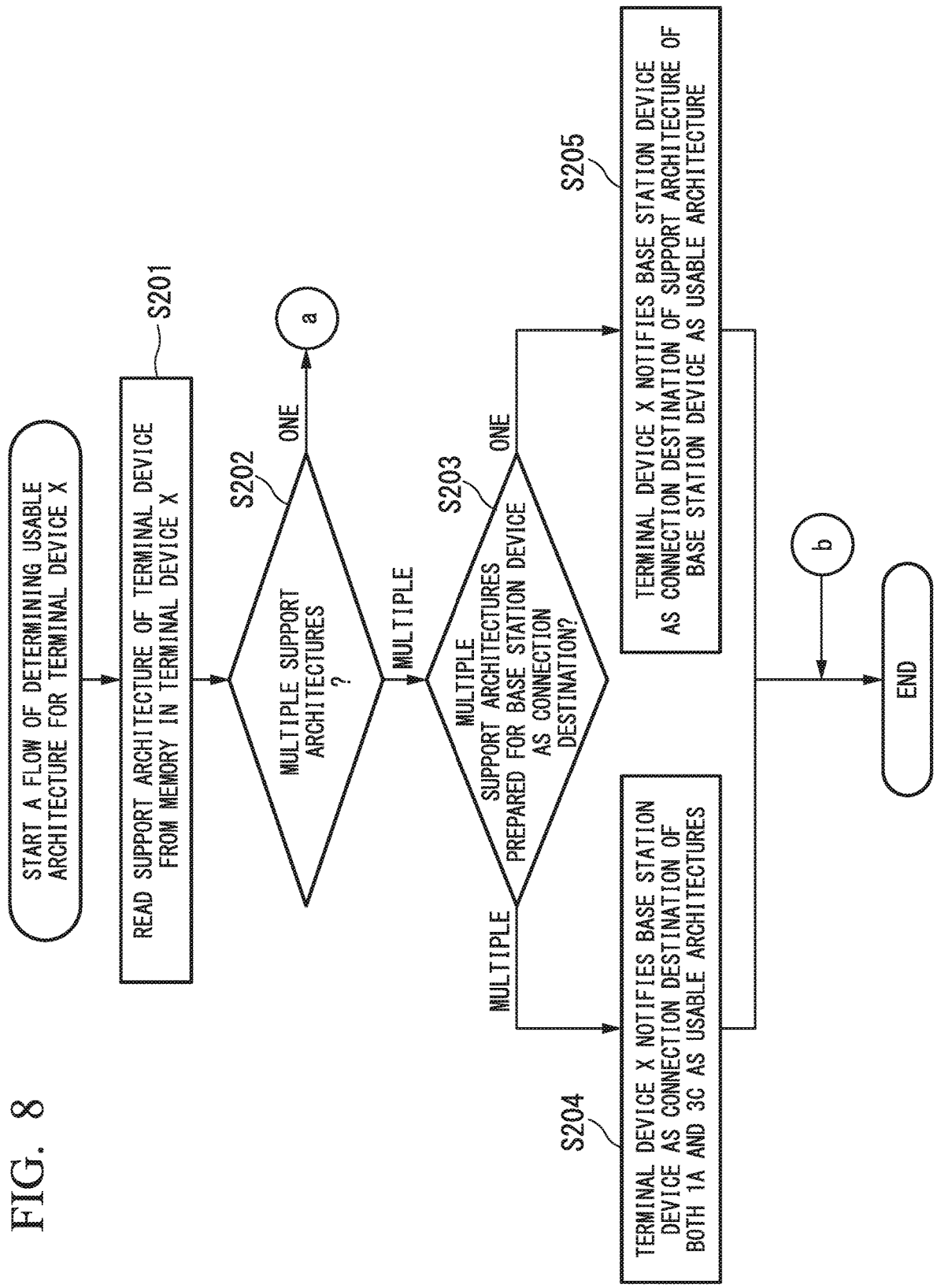
FIG. 8 is a flowchart showing a procedure concerning an available architecture determination method according to a third embodiment of the present invention.
Figure 9:
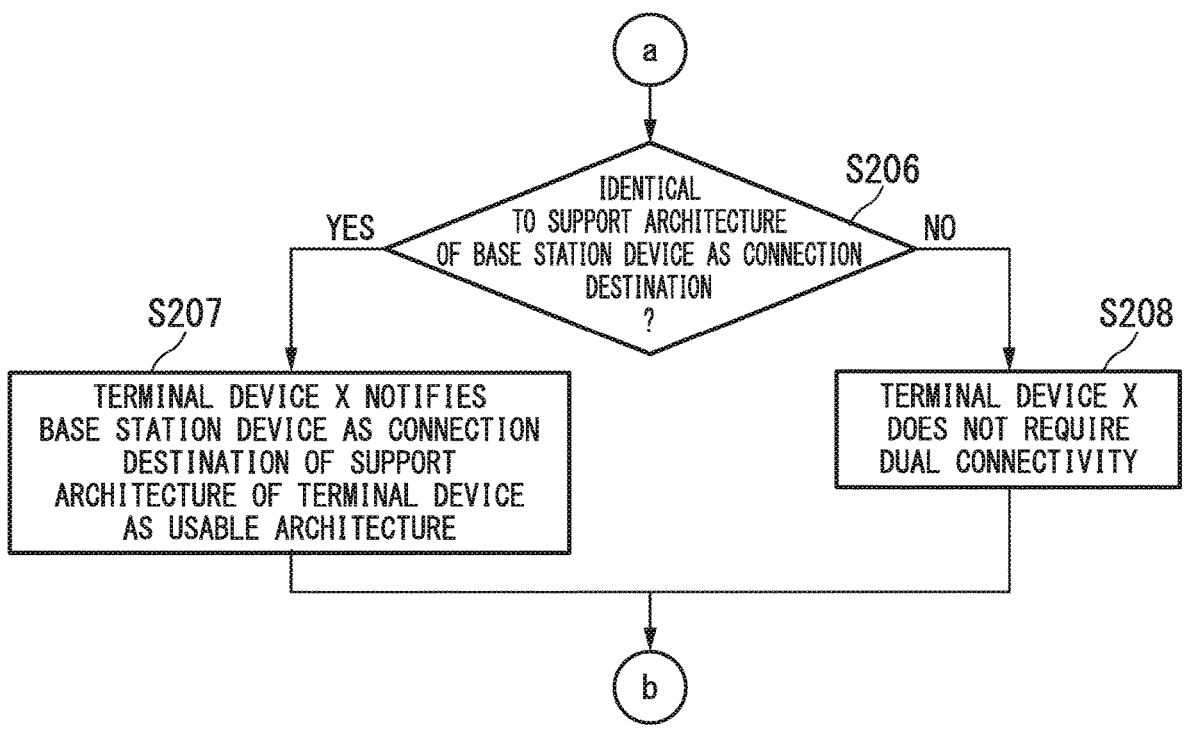
FIG. 9 is a flowchart showing a procedure concerning an available architecture determination method according to the third embodiment of the present invention.
Figure 10:
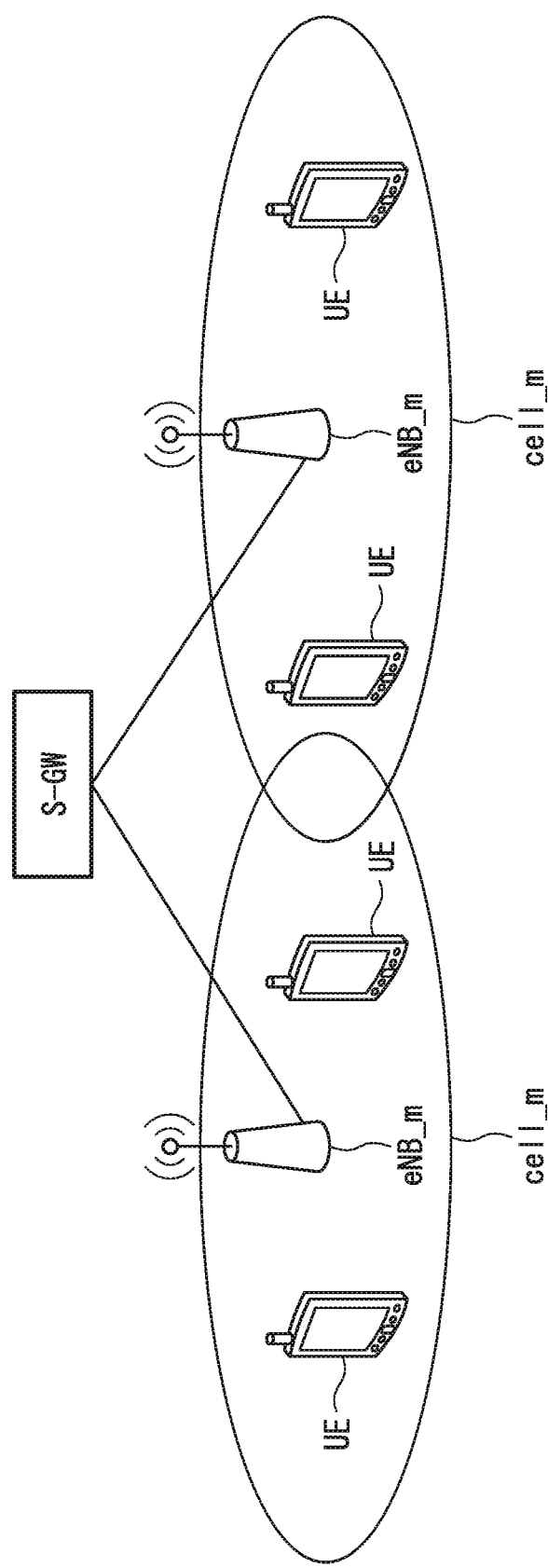
FIG. 10 is a conceptual diagram showing an example of a configuration of an LTE system.
Figure 11:
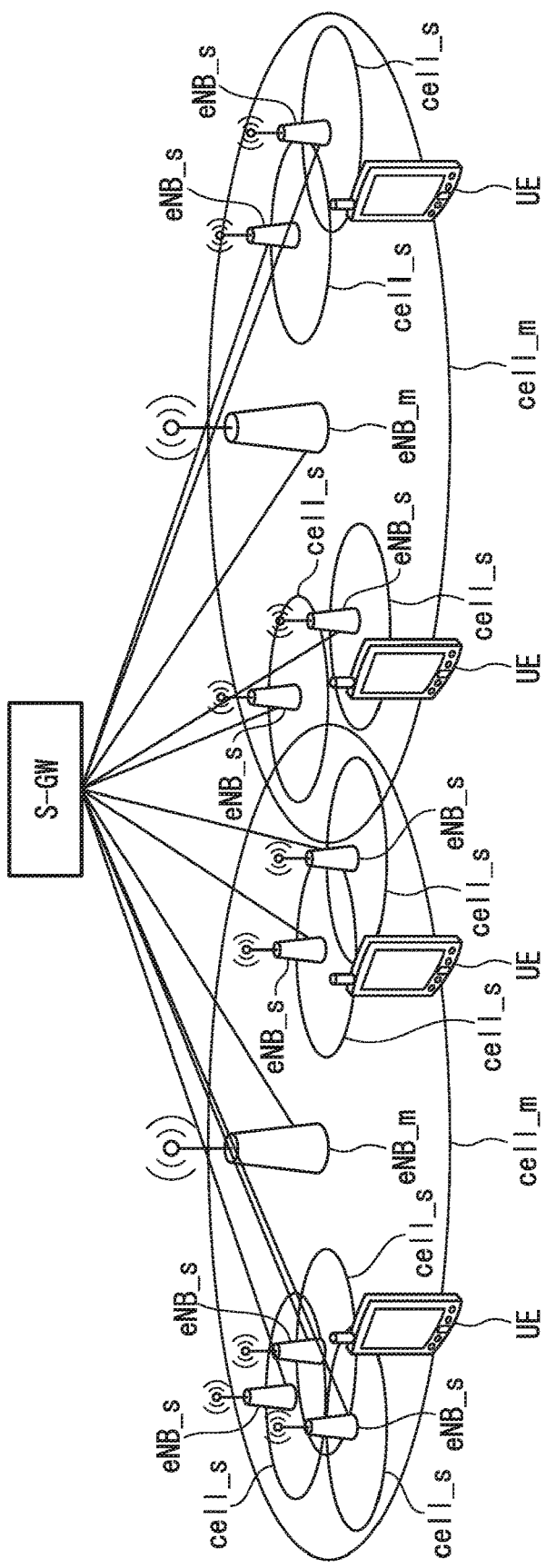
FIG. 11 is a conceptual diagram showing another example of a configuration of an LTE system.

The usable architecture determination process of the controller 22 of the terminal device UE will be described with reference to FIGS. 8 and 9. FIGS. 8 and 9 are flowcharts showing the procedure of a usable architecture determination method according to the third embodiment of the present invention. In FIGS. 8 and 9, the terminal device UE is referred to as a terminal device X. In the description of FIGS. 8 and 9, the terminal device UE will be called the terminal device X.

(Step S201)

The controller 22 reads the support architecture information 231 of the terminal device X from the storage unit 23.

(Step S202)

The controller 22 determines whether or not the read support architecture information 231 represents multiple architectures. The flow proceeds to step S203 when the determination result indicates multiple architectures, while the flow proceeds to step S206 shown in FIG. 9 when the determination result indicates a single architecture.

(Step S203)

The controller 22 determines whether or not the support architecture information (i.e. the information representing architectures supported by the base station device eNB), notified by the base station device eNB serving as a connection destination of the terminal device X, represents multiple architectures. The flow proceeds to step S204 when the determination result indicates multiple architectures, while the flow proceeds to step S205 when the determination result indicates a single architecture.

(Step S204)

The controller 22 determines both the architectures 1A and 3C as usable architectures. This is because both the terminal device X and the base station device eNB serving as a connection destination of the terminal device X support both the architectures 1A and 3C. The controller 22 transmits the information, representing both the architectures 1A and 3C serving as usable architectures of the terminal device X, to the base station device eNB serving as a connection destination of the terminal device X by way of the wireless communication part 21.

(Step S205)

The controller 22 determines a single architecture supported by the base station device eNB, serving as a connection destination of the terminal device X, as the usable architecture among the architectures 1A and 3C. This is because the terminal device X supports both the architectures 1A and 3C while the base station device eNB, serving as a connection destination of the terminal device X, supports one of the architectures 1A and 3C alone. The controller 22 transmits the information, representing a single architecture supported by the base station device eNB serving as a connection destination of the terminal device X, as the usable architecture of the terminal device X to the base station device eNB serving as a connection destination of the terminal device X by way of the wireless communication part 21.

(Step S206)

The controller 22 determines whether or not any one of architectures represented by the support architecture information (i.e. the information of architectures supported by the base station device eNB), notified by the base station device eNB serving as a connection destination of the terminal device X, is identical to a single architecture represented by the support architecture information 231 which is read from the storage unit 23 in step S201. The flow proceeds to step S207 when the determination result indicates that those architectures are identical to each other, while the flow proceeds to step S208 when the determination result indicates that those architectures are not identical to each other.

(Step S207)

The controller 22 determines one of the architectures 1A or 3C as the usable architecture, i.e. a single architecture supported by the terminal device X. This is because the terminal device X supports one of the architectures 1A and 3C alone while the base station device eNB, serving as a connection destination of the terminal device X, supports a single architecture supported by the terminal device X. The controller 22 transmits the information, representing a single architecture supported by the terminal device X as the usable architecture of the terminal device X, to the base station device eNB serving as a connection destination of the terminal device X by way of the wireless communication part 21.

(Step S208)

The controller 22 determines that the terminal device X does not implement dual connectivity with the base station device eNB serving as a connection destination of the terminal device X. This is because the terminal device X supports one of the architectures 1A and 3C alone while the base station device eNB serving as a connection destination of the terminal device X does not support a single architecture supported by the terminal device X. The controller 22 transmits the information, representing no usable architecture for the terminal device X, to the base station device eNB serving as a connection destination of the terminal device X by way of the wireless communication part 21.

According to the foregoing embodiments, the base station device eNB is able to recognize architectures supported by the terminal device UE connected thereto. Thus, it is possible to obtain an effect of contributing to the implementation of dual connectivity in the condition in which a plurality of terminal device UE support different architectures.

According to the second embodiment, it is possible to use architectures in different manners depending on the characteristics of architectures.

In the above, the embodiments of the present invention are described in detail with reference to the drawings, but concrete configurations are not necessarily limited to the embodiments; hence, the present invention may embrace any design changes without departing from the subject matter of the invention.

For example, the second embodiment uses transmission rates as the information representing the communication quality of the line X2; however, it is possible to use other information representing the communication quality of the line X2. As the information representing the communication quality of the line X2, for example, it is possible to name a delay time of the line X2. As the information representing the communication quality of the line X2, for example, it is possible to name the information representing the communication capacity of the line X2.

The second embodiment uses the maximum communication quality of the line X2, but it is possible to use other information representing the average communication quality of the line X2.

As the place for storing the base station architecture information 142 of another base station device eNB adjacent to the base station device eNB, for example, it is possible for the base station device eNB to use an adjacency table (or a neighbor relation table). In an LTE system, the base station device eNB uses the adjacency table to hold the information of another base station device eNB adjacent to the base station device eNB. It is possible for the base station device eNB to store the information, representing the communication quality of the line X2 which is established between the base station device eNB and another base station device eNB adjacent to the base station device eNB, in the adjacency table.

The foregoing embodiments employ the procedure of inquiring about terminal capability information (or user equipment capability) as the method of the terminal device UE transmitting the information, representing architectures supported thereby, and the information enabling/disabling the concurrent use of multiple architectures to the base station device eNB; but it is possible to employ other methods. For example, it is possible to modify the foregoing embodiment such that the terminal device UE transmits to the base station device eNB "the information representing the corresponding status of the terminal device UE depending on the functionality of a wireless communication system (Feature group indicator)" which should be transmitted in response to an inquiry from the base station device eNB, wherein this information may further include the information representing architectures supported by the terminal device UE or the information enabling/disabling the concurrent use of multiple architectures.

The foregoing embodiments name an LTE system as one example of a wireless communication system; however, the present invention can be applied to other wireless communication systems other than LTE systems. For example, the foregoing embodiments refer to the architecture 3C using the line X2: however, it is possible to use other architectures using other lines.

It is possible to store computer programs, implementing the function of the base station device eNB or the function of the terminal device UE according to the foregoing embodiments, in computer-readable storage media; thus, it is possible to load and execute programs stored in storage media with computer systems. Herein, the term "computer system" may embrace OS and hardware such as peripheral devices.

The term "computer-readable storage media" refers to flexible disks, magneto-optic disks, ROM, non-volatile rewritable memory such as flash memory, portable media such as DVD (Digital Versatile Disk), and storage devices such as hard-disk units installed in computer systems.

Moreover, the term "computer-readable storage media" may embrace any measures configured to temporarily hold programs such as volatile memory (e.g. DRAM (Dynamic Random Access Memory)) installed in computer systems serving as servers and clients when programs are transmitted through communication lines such as telephone lines and networks such as the Internet.

The above programs can be transmitted from the computer system storing programs in storage units to other computer systems by means of transmission media or by way of transmission waves propagating through transmission media. Herein the term "transmission media" configured to transmit programs may refer to any media having information transmitting functions, e.g. networks (communication networks) such as the Internet, and communication lines such as telephone lines.

The above programs may achieve part of the foregoing functions.

Additionally, the above programs can be produced as differential files (differential programs) which are combined with pre-installed programs of computer systems so as to achieve the foregoing functions.

REFERENCE SIGNS LIST 11, 21 . . . wireless communication part
12 . . . communication part
13, 22 . . . controller
14, 23 . . . storage unit
141 . . . support architecture information
142 . . . base station architecture information
143 . . . terminal architecture information
24 . . . input part
25 . . . output part
231 . . . support architecture information
eNB . . . base station device
S-GW . . . communication equipment
UE . . . terminal device

The invention claimed is:

1. A terminal device configured to communicate with a communication equipment via a base station device and a secondary base station device according to a plurality of architectures, comprising:
   a storage medium configured to store support architecture information and multiple-architecture concurrent use enabling information to concurrently use at least a first architecture and a second architecture among the plurality of architectures when establishing a communication link with the base station device while establishing a secondary communication link with the secondary base station device, wherein the base station device is configured to store first support architecture information supporting at least one of the first architecture and the second architecture and second support architecture information representing at least one of the first architecture and the second architecture supported by the secondary base station device separately than the support architecture information;
   a wireless communicator connectable to the base station device and the secondary base station device; and
   a controller configured to control the wireless communicator to:
     receive an inquiry about terminal capability information of the terminal device from the base station device;
     add the support architecture information or the multiple-architecture concurrent use enabling information to the terminal capability information of the terminal device or corresponding status information of the terminal device depending on a function of a wireless communication system; and
     transmit the terminal capability information to the base station device such that the base station device determines a usable architecture as one of (i) through (iii),
     (i) the first architecture when the support architecture information of the terminal device supports the first architecture while the first support architecture information and the second support architecture information solely share the first architecture, (ii) the second architecture when the support architecture information of the terminal device supports the second architecture while the first support architecture information and the second support architecture information solely share the second architecture on a condition that a maximum transmission rate between the base station device and the secondary base station device is above a predetermined threshold value, (iii) either the first architecture or the second architecture, which satisfies communication quality required by the terminal device indicating the multiple-architecture concurrent use enabling information when the first support architecture information and the second architecture information support both the first architecture and the second architecture on the condition that the maximum transmission rate between the base station device and the secondary base station device is above the predetermined threshold value.

2. The terminal device according to claim 1, wherein the support architecture information represents the plurality of architectures according to another wireless communication system than an LTE (Long-Term Evolution) system.

3. The terminal device according to claim 1, wherein the support architecture information represents the plurality of architectures according to an LTE (Long-Term Evolution) system or another wireless communication system than the LTE system.

4. A base station device configured to relay a communication established between a communication equipment and a terminal device in association with a secondary base station device according to a plurality of architectures, comprising:

a storage unit configured to store first support architecture information supporting at least one of a first architecture and a second architecture and second support architecture information representing at least one of the first architecture and the second architecture supported by the secondary base station device;

a wireless communicator configured to receive from the terminal device its support architecture information including the multiple-architecture information to concurrently use at least the first architecture and the second architecture among the plurality of architectures when establishing a communication link with the base station device while establishing a secondary communication link with the secondary base station device, from the terminal device; and a controller configured to determine a usable architecture as one of (i) through (iii), (i) the first architecture when the support architecture information of the terminal device supports the first architecture while the first support architecture information and the second support architecture information solely share the first architecture, (ii) the second architecture when the support architecture information of the terminal device supports the second architecture while the first support architecture information and the second support architecture information solely share the second architecture on a condition that a maximum transmission rate between the base station device and the secondary base station device is above a predetermined threshold value, (iii) either the first architecture or the second architecture, which satisfies communication quality required by the terminal device indicating the multiple-architecture concurrent use enabling information when the first support architecture information and the second architecture information support both the first architecture and the second architecture on the condition that the maximum transmission rate between the base station device and the secondary base station device is above the predetermined threshold value.

5. A usable architecture determination method for a terminal device configured to communicate with a communication equipment via a base station device and a secondary base station device according to a plurality of architectures and to store support architecture information and multiple-architecture concurrent use enabling information to concurrently use at least a first architecture and a second architecture among the plurality of architectures when establishing a communication link with the base station device while establishing a secondary communication link with the secondary base station device, wherein the base station device is configured to store first support architecture information supporting at least one of the first architecture and the second architecture and second support architecture information representing at least one of the first architecture and the second architecture supported by the secondary base station device separately than the support architecture information, the usable architecture determination method comprising:

receiving an inquiry about terminal capability information from the base station device;

adding the support architecture information or the multiple-architecture concurrent use enabling information to the terminal capability information or corresponding status information of the terminal device depending on a function of a wireless communication system; and transmitting the terminal capability information to the base station device such that the base station device determines a usable architecture as one of (i) through (iii), (i) the first architecture when the support architecture information of the terminal device supports the first architecture while the first support architecture information and the second support architecture information solely share the first architecture, (ii) the second architecture when the support architecture information of the terminal device supports the second architecture while the first support architecture information and the second support architecture information solely share the second architecture on a condition that a maximum transmission rate between the base station device and the secondary base station device is above a predetermined threshold value, (iii) either the first architecture or the second architecture, which satisfies communication quality required by the terminal device indicating the multiple-architecture concurrent use enabling information when the first support architecture information and the second architecture information support both the first architecture and the second architecture on the condition that the maximum transmission rate between the base station device and the secondary base station device is above the predetermined threshold value.

6. A non-transitory computer-readable storage medium having a computer program executable by a computer serving as a terminal device configured to communicate with a communication equipment via a base station device and a secondary base station device according to a plurality of architectures and to store support architecture information and multiple-architecture concurrent use enabling information to concurrently use at least the first architecture and the second architecture among the plurality of architectures when establishing a communication link with the base station device while establishing a secondary communication link with the secondary base station device, wherein the base station device is configured to store first support architecture information supporting at least one of the first architecture and the second architecture and second support architecture information representing at least one of the first architecture and the second architecture supported by the secondary base station device separately than the support architecture information, thus implementing:

receiving an inquiry about terminal capability information from the base station device;

adding the support architecture information or the multiple-architecture concurrent use enabling information to the terminal capability information or corresponding status information of the terminal device depending on a function of a wireless communication system; and transmitting the terminal capability information to the base station device such that the base station device determines a usable architecture as one of (i) through (iii), (i) the first architecture when the support architecture information of the terminal device supports the first architecture while the first support architecture information and the second support architecture information solely share the first architecture, (ii) the second architecture when the support architecture information of the terminal device supports the second architecture while the first support architecture information and the second support architecture information solely share the second architecture on a condition that a maximum transmission rate between the base station device and the secondary base station device is above a predetermined threshold value, (iii) either the first architecture or the second architecture, which satisfies communication quality required by the terminal device indicating the multiple-architecture concurrent use enabling information when the first support architecture information and the second architecture information support both the first architecture and the second architecture on the condition that the maximum transmission rate between the base station device and the secondary base station device is above the predetermined threshold value.

\* \* \* \* \*